May 17, 1960 J. K. GODBEY 2,936,614
SYSTEM FOR MEASUREMENT OF FLUID FLOW DEPENDENT FORCES
Filed Dec. 23, 1954 4 Sheets-Sheet 1
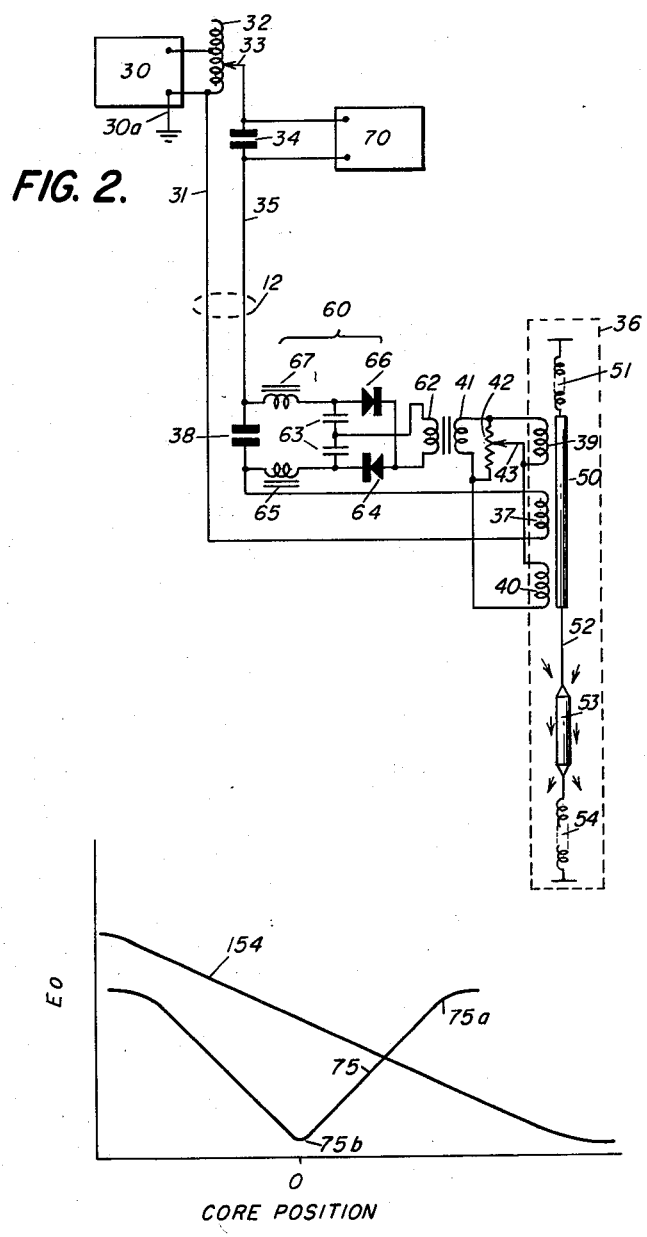
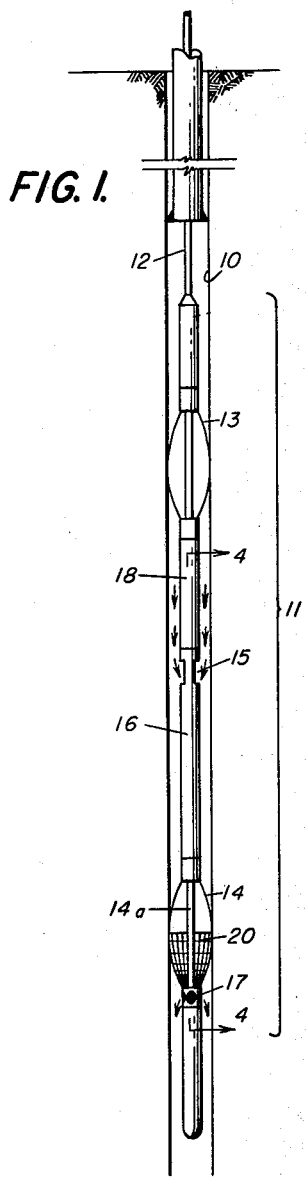
JOHN K. GODBEY
INVENTOR.
BY D. Carl Richards
ATTORNEY

JOHN K. GODBEY
INVENTOR.

BY D. Care Richards
ATTORNEY

May 17, 1960     J. K. GODBEY     2,936,614
SYSTEM FOR MEASUREMENT OF FLUID FLOW DEPENDENT FORCES
Filed Dec. 23, 1954     4 Sheets-Sheet 3

JOHN K. GODBEY
INVENTOR.

BY D. Carl Richards
ATTORNEY

May 17, 1960 J. K. GODBEY 2,936,614
SYSTEM FOR MEASUREMENT OF FLUID FLOW DEPENDENT FORCES
Filed Dec. 23, 1954 4 Sheets-Sheet 4

JOHN K. GODBEY
INVENTOR.

BY *D. Carl Richards*
ATTORNEY

United States Patent Office 2,936,614
Patented May 17, 1960

2,936,614

SYSTEM FOR MEASUREMENT OF FLUID FLOW DEPENDENT FORCES

John K. Godbey, Dallas, Tex., assignor, by mesne assignments, to Socony Mobil Oil Company, Inc., a corporation of New York Application December 23, 1954, Serial No. 477,375

7 Claims. (Cl. 73—155)

This invention relates to measurement of fluid flow in a passage and more particularly to the measurement of translational variations in position of an element due to flow dependent forces.

The rate of flow of fluid in well bores in many instances must be accurately known but in some instances a qualitative measurement may be adequate in order to control or monitor production and conservation programs particularly in connection with operations relating to oil and gas.

Systems for measuring flow on a qualitative basis using fluid driven propellers and the like suitably coupled to a responsive measuring system have been extensively used. However, they have been found undesirable for many applications. The present invention is designed to overcome many of the limitations found in conventional measuring systems and to provide a flow measuring unit readily movable in restricted passages such as well bores and adaptable to various conditions encountered.

It is an object of the present invention to provide a flow measuring unit that may readily be movable in restricted passages such as oil well tubing. It is a further object of the invention to provide a flow measuring system operable over a single conductor shielded cable such as conventionally used in well logging systems and which is adapted by its small size to operate through packing systems which resist high well pressures.

In accordance with one embodiment of the invention there is provided an elongated unit which has a flow channel therethrough and which is adapted to be movably supported in the passage. Means are provided for flow of fluids in the passage through the flow channel in the elongated unit. A movable member is positioned in a magnetic field which is adjacent a zone of flow in the unit. Means are then provided for sensing variations in the position of the magnetic element relative to the unit through induction from the magnetic field.

In accordance with a further aspect of the invention there is provided a telemetering system for use with single conductor well cables and adapted to produce a unidirectional voltage proportional to the magnitude of a condition.

For further objects and advantages of the invention and for a more complete understanding thereof, reference may now be had to the following description taken in conjunction with the accompanying drawings in which:

Fig. 1 illustrates operation of the invention in a borehole;

Fig. 2 is a schematic diagram of the flow measuring system;

Fig. 3 illustrates the output of the system for various rates of flow;

Figure 8:
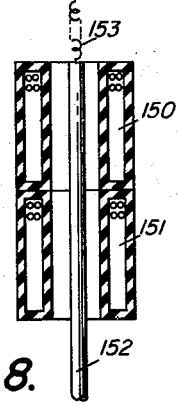

Figs. 4–7 constitute a sectional view of the logging system taken along lines 4—4 of Fig. 1;

Fig. 8 illustrates another embodiment of a suitable coil system; and

Figure 4:
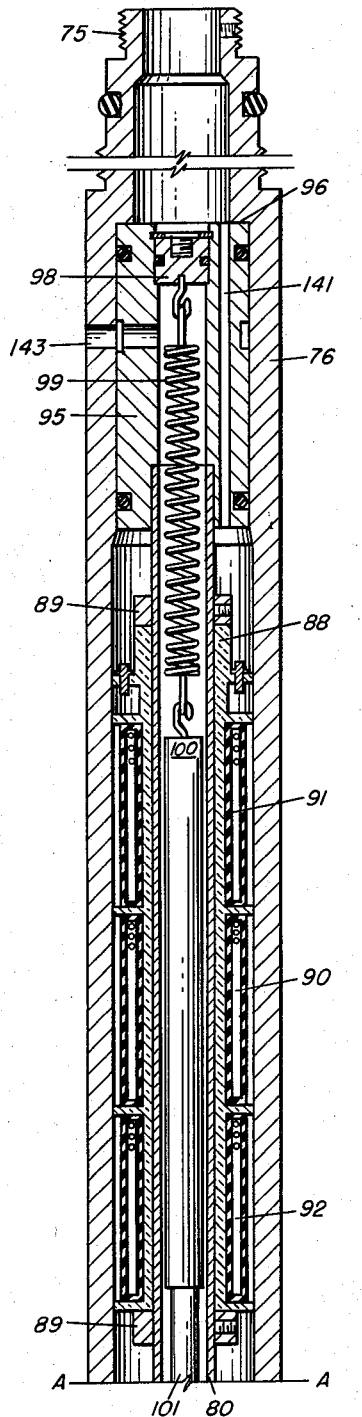
Figure 5:
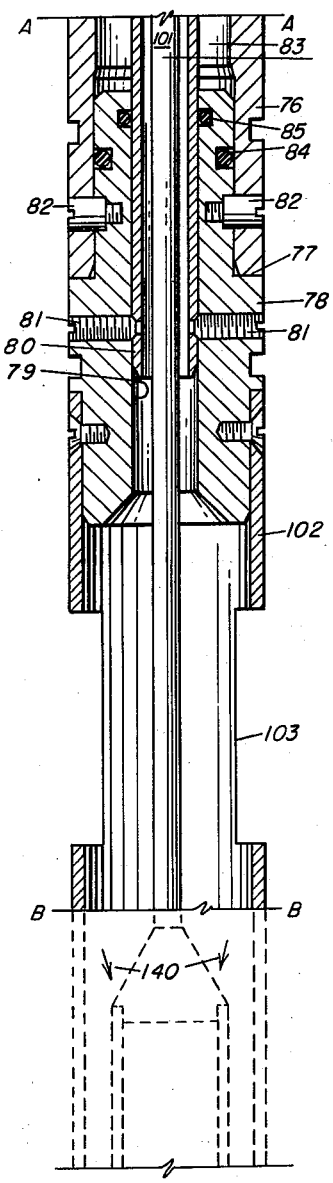
Figure 6:
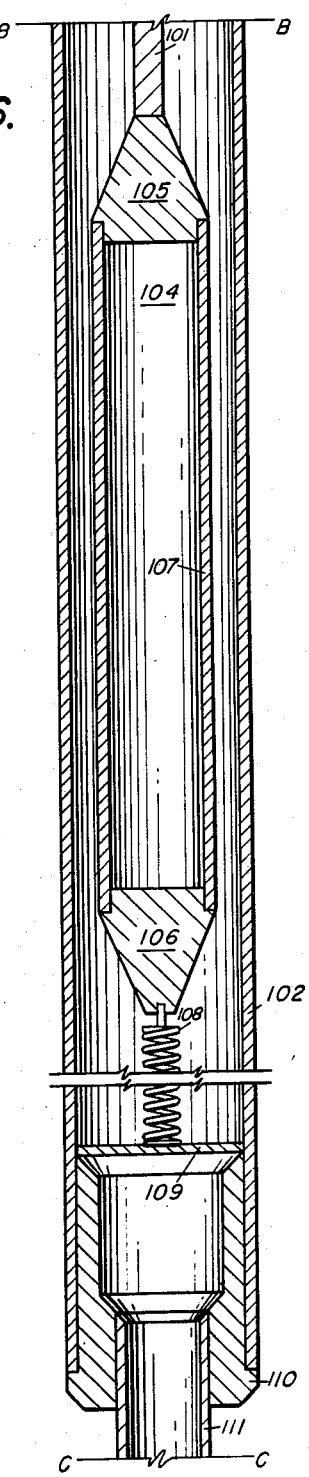
Figure 9:
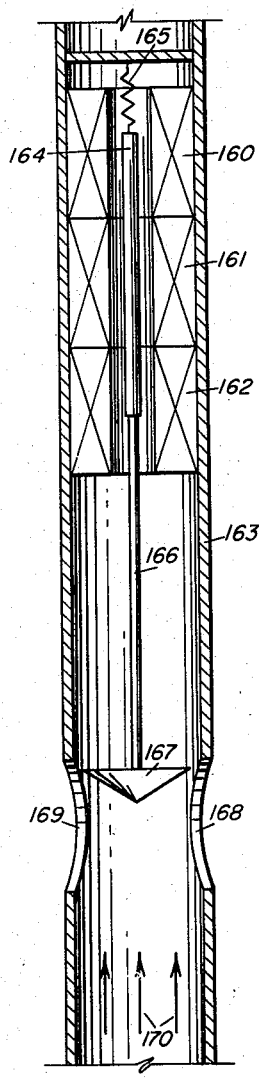
Figure 10:
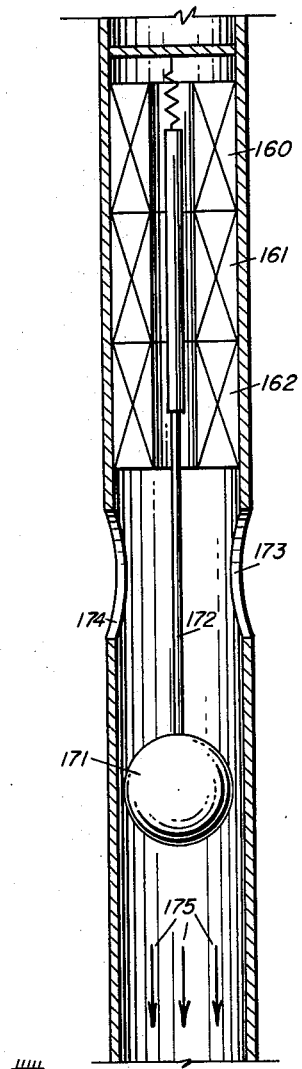
Figure 11:
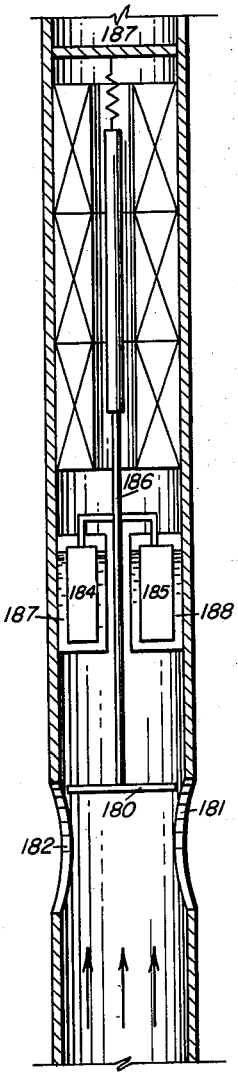

Figs. 9, 10 and 11 are modifications of the sensing system shown in Figs. 4–6.

Referring now to Fig. 1, there is illustrated a system for measuring the rate of flow of fluids in a well bore 10. More particularly, an elongated unit 11 is supported at its upper end by cable means 12. An upper bow spring device 13 and a lower bow spring device 14 mounted on unit 11 maintain it in the center of borehole 10. Flow ports are provided intermediate the bow springs 13 and 14 such as port 15 which permits fluid to flow into the cylindrical portion 16 of unit 11. The flow path includes the portion 16 and a smaller tube extending through the bow spring device 14. The smaller tube, not seen in Fig. 1, is positioned behind the bow spring 14a. It terminates in ports 17 which open into the borehole 10 below the bow spring 14. Both bow spring devices 13 and 14 are resilient and will change dimension in dependence upon the diameter of the borehole. A collapsible flow responsive element is mounted on bow spring device 14 and comprises a cone 20 of flexible impervious material supported by the spring members of the bow spring device 14 such that substantially all flow in the borehole 10 may be forced through the channel inside section 16.

In a preferred embodiment of the invention the flow diverter expands to the borehole walls completely to block the borehole. However, as will hereinafter be shown, satisfactory measurements of fluid flow may be secured in some cases without any flow diverter to determine the points in a borehole, for example, where injected fluids are flowing into the formations. The borehole unit 11 will be positioned at each of the plurality of different depths and a measurement made at each depth of the flow character. Calibration of the measuring system together with positive diversion of all flow will permit an accurate quantitative measurement of flow. In many instances measurement of relative flow rates is sufficient, but even with partial flow diversion a calibration will permit quantitative measurements to be made. In some instances no flow diversion other than provision of ports may be sufficient. In any case the flow of some fluid through the member 16 produces flow dependent forces which are sensed through the use of a magnetic system which moves along the flow channel to produce an output voltage proportional to such movement.

The sensing system of the flow measuring unit schematically is illustrated in Fig. 2. A power source 30, conveniently though not necessarily having a 60 cycle alternating current output, is connected at one terminal to a borehole cable conductor 31 and to ground terminal 30a. Source 30 also is connected to the input of a variable transformer winding 32. A tap 33 on the transformer winding 32 is connected by way of condenser 34 to the second cable conductor 35. Alternating current from source 30 is transmitted downhole over conductors 31 and 35 which may comprise cable 12 of Fig. 1. Since conductor 31 is connected to ground at the lower terminal 30a of source 30, the cable 12 may comprise the conventional "single conductor cable" used extensively in well logging.

The electrical elements diagrammatically shown in the dotted outline 36 are housed in the section 18 of unit 11, Fig. 1. More particularly, a primary coil 37 is connected to conductors 31 and 35 by way of condenser 38. Flow of alternating current from source 30 in coil 37 establishes a magnetic field inside unit 11. A pair of secondary coils 39 and 40 are positioned closely adjacent coil 37 and are connected in series opposition and then to the primary winding of a transformer 41. Transformer 41 is shunted by a balancing resistor 42. The movable arm or tap 43 on resistor 42 is connected to the common terminal between coils 39 and 40.

An elongated magnetic core 50 is suspended at its upper end by a spring 51 and is connected through link 52 to an active element 53 which in turn is connected at its lower end to a suitable support by a spring 54. The elements 50—54 comprising the suspension may be so selected and mounted that when the unit 11 is immersed in a quiescent body of the fluid to be measured the core member 50 will be in a predetermined position as hereinafter described with respect to the array of coils 37, 39 and 40.

The secondary winding of transformer 41 is connected by way of a full wave voltage doubler and rectifier network 60 to cable conductors 31 and 35. More particularly, the upper terminal of winding 62 is connected to the common terminal between condensers 63. The lower terminal of winding 62 is connected by way of rectifier 64 and inductance 65 to one terminal of condenser 38. The lower terminal of winding 62 is also connected by way of rectifier 66 and inductance 67 to the upper terminal of condenser 38. Thus a unidirectional voltage effectively is placed on conductors 31 and 35 for transmission uphole which voltage is proportional to the voltage applied to transformer winding 41. At the same time the inductors 65 and 67 isolate the rectifiers 64 and 66 from the alternating current on conductors 31 and 35.

The D.C. voltage from rectifiers 64 and 66 appears across condenser 34 at the earth's surface and is applied to a measuring and/or recording means 70. Fluid flow in the zone occupied by the resiliently mounted member comprising elements 50—54, particularly the flow directed onto element 53, produces translation of the magnetic core 50 relative to the coils 37, 39 and 40. The net voltage from coils 39 and 40 is applied to the winding 41 to produce the D.C. voltage across condenser 34.

Referring to Fig. 3, the curve 75 is representative of the net voltage $E_0$ from coils 39 and 40 as a function of the position of core 50. The voltage $E_0$ is a minimum, approaching zero when the core 50 is symmetrically disposed with reference to the coil system. For positions above or below the latter point the voltage $E_0$ is higher.

From the foregoing it will be seen that the present invention resides particularly in the provision of an inductive sensing system utilizing variations in the relative position of a magnetic core and its associated windings. Forces developed on the core are dependent upon and indicative of flow.

In Figs. 4–7 there is illustrated a specific embodiment of the system suitable for carrying out the present invention. Figs. 4–7 are to be taken together as they comprise different sections of the elongated unit 11.

In Fig. 4 the threaded end 75 is adapted to be secured to an upper housing member such as supports the bow spring device 13 of Fig. 1. The portion of the unit shown in Fig. 4 includes an outer cylindrical housing 76 having its lower extremity 77 shown in Fig. 5.

Preferably the cylindrical housing 76 has a high magnetic susceptibility thereby providing a magnetic shield. Housing 76 may be a unitary tube of high susceptibility as shown in Fig. 4. Alternatively the housing 76 may be formed from an outer sheath of stainless steel having a magnetic insert or an outer magnetic sheath or casing.

A transformer structure having a movable core is mounted on an insert 78 (Fig. 5). The insert structure is anchored at the lower end of housing 76 and extends upward into the housing 76. More particularly, the insert 78 has a central channel 79 into which there extends an elongated metallic tube 80. Tube 80 is secured to insert 78 by set screws 81 which threadedly engage insert 78 and have beveled ends registering in complementary openings in the wall of the tube 80. Studs 82 secure the insert 78 in the lower end of the cylindrical element 76. The annulus 83 between cylinder 76 and the tube 80 is sealed off by an outer O-ring 84 and an inner O-ring 85, Fig. 5.

A three-coil transformer structure is mounted on the tube 80, Fig. 4, and comprises coil form 88 supported by rings 89 which are mounted on tube 80 by suitable set screws. Three coils 90, 91 and 92 are disposed in an end-to-end array along the form 88. Tube 76 is bored internally to have a re-entrant opening which receives an upper mounted element 95 which is secured to the upper end of the tube 80. The upper end of member 95 seats against the shoulder 96 and is closed by a plug 98.

The spring 99 supported at its upper end from the plug 98 is connected at its lower end to a magnetic rod 100 which, as a magnetic core, is common to all three of coils 90—92. The core 100 extends substantially the entire length of the three coils 90—92. A rod 101 is fastened to the lower end of the core 100 and extends downwardly through insert 78 into a tube 102 which is secured to the lower end of insert 78. Flow ports such as port 103 in the walls of the tube 102 provide for flow of fluids to or from tube 102.

Referring to Fig. 6 it will be seen that rod 101 supports float 104. The float is comprised of a pair of end members 105 and 106 and an elongated tube 107 positioned inside the cylinder 102. A spring 108 is secured to the lower end of the float, i.e., to the end member 106, and is anchored to a strut 109 extending across the lower end of cylinder 102.

Figure 7:
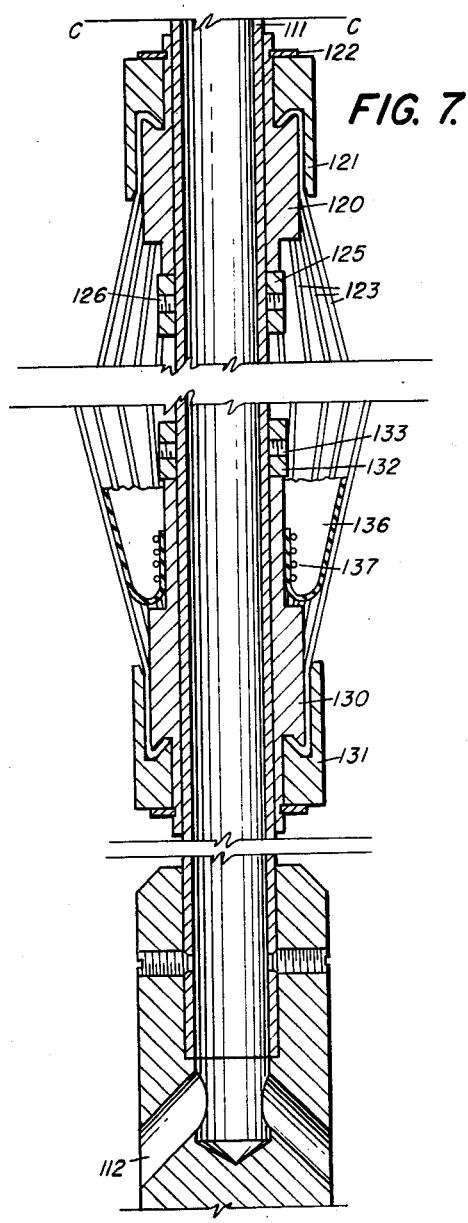

An insert 110 is secured in the lower end of cylinder 102. A tube 111 of relatively small diameter compared to tube 102, extends from the lower end of insert 110. The exterior of tube 111 forms a slide-way for a collapsible packing device shown in Fig. 7. As will be explained, the packer shown in Fig. 7 is adapted for use in wells where fluid is injected into the formations from surface storage as in water flooding operations. The fluids flowing downwardly through tube 111, Fig. 7, may pass to the outside of the unit through ports such as ports 112.

The packer or flow diverter is utilized to enhance fluid flow through ports 103, Fig. 5, and into cylinder 102. The packer shown in Fig. 7 includes an upper pair of telescoping elements 120 and 121. Element 121 may be forced down onto element 120 and there locked into position by a split ring 122 which registers in a groove on the exterior of member 120. A plurality of flat springs 123 are clamped on the upper end thereof between the elements 120 and 121 and extend downwardly along tube 111. Elements 120 and 121 are slidable along tube 111 but are limited to downward travel by ring 125 which is secured as by set screws 126 to the tube 111. The springs 123 are clamped at their lower ends in a lower slidable unit comprising telescoping locking members 130 and 131. Members 130 and 131 are slidable along tube 111 and are limited in upward movement by a stop 132 secured to the tube 111 by set screw 133. For the purpose of illustration, the diverter has been shown in two sections. However, it is to be understood that the springs 123 are continuous as they extend between members 120—121 and 130—131. A cone-like structure 136 of fabric or other material impervious to fluids is secured to member 130 as by a coil 137 wrapped tightly around the lower end of cone 136. The cone-like fabric extends approximately half the length of the springs 123 and by means not shown, is clamped at its upper edge to the center of springs 123.

In the form illustrated the cone 136 is adapted to arch the springs outward against the walls of an adjacent passage such as a borehole when the instrument is suspended in a zone where fluids flow downwardly. This action forces fluids to enter the measuring instrument at ports 103. The downward flow of fluids in the instrument such as indicated by arrows 140, Fig. 5, produce flow dependent forces on the float 104 moving the core 100 downward relative to the coils 90—92. The flux linkage between the primary coil 90 and the secondary coils 91 and 92 is thus changed which is proportionately reflected in output voltage from coils 91 and 92. Although terminal conductors from the coils 90—92 have not been shown in Fig. 4, a convenient channel 141 is provided through the member 95 so that the conductors completing circuits to the coils may be threaded into an upper instrument section.

Since the float 104, the rod 101, the core 100 and spring 99 are all in a zone permeated by the fluids, a port 143 is provided to permit fluids completely to fill the tube 80. It will be seen that the resiliently suspended structure of the present invention comprises the core 100 and the float or flow responsive element 140. Resilient supports at both upper and lower ends are preferred to prevent flutter or otherwise stabilize the suspension.

In operation, the instrument may be initially adjusted in a given fluid in the absence of flow such that the output from the system bears a predetermined relation dictated by the curve shown in Fig. 3. For upward flow the initial relative position of core 100 and coils 90—92 will be such that the output corresponds to operation at point 75a on curve 75, Fig. 3. Thereafter, upward movement of the suspension relative to the coils in response to flow forces will reduce the output voltage in proportion to fluid flow until the null point 75b is approached. Preferably the operation will be confined to the linear portion of curve 75 between points 75a and 75b. It is to be noted that curve 75 is a double valued function. In most instances the direction of flow is not in question. Rather the relative rate of flow at different points is to be determined so that operation as shown by curve 75 may readily be interpreted in terms of fluid flow.

It may be desirable to operate this system with only two coils such as shown in Fig. 8. Coils 150 and 151 are magnetically coupled through a relatively slim magnetic core element 152 suspended by spring 153 at the upper end thereof, positioned in a quiescent body of fluid, the upper end of rod 152 coincides approximately with the upper end of coil 150. Coil 150, for example, may be energized from a suitable alternating current source and coil 151 may be connected to a suitable detecting circuit such as circuit 60, Fig. 2. When this is the case, deflection of core 152 upon flow of such fluid will produce a voltage which over a range much greater than shown in curve 75 linearly increases with displacement. Such operation is represented by the function 154 of Fig. 3 and in many instances will be preferred over the system shown in Figs. 4–7. It should be noted that the system of Fig. 2 may be made essentially a two coil system by adjusting slider 43 to either maximum position.

Figs. 9–11 illustrate other modifications of the invention. In Fig. 9 three coils represented by the blocks 160, 161, 162 are mounted inside a tube 163. A core 164 symmetrically positioned inside coils 160—162 is supported at its upper end by spring 165. The lower end of the core is fastened to a slim rod 166 which supports a cone-shaped end member 167 which is downwardly directed and positioned with the upper edge thereof in the region of the upper boundary of ports 168 and 169. This system is particularly suitable for the measurement of flow forces produced by upward flow in the unit such as represented by the arrows 170.

A similar device for downwardly flow is shown in Fig. 10 and comprises a sphere 171 supported by a rod 172 in the flow path below ports 173 and 174. The downward flow here is represented by arrows 175. In these systems the flow over the conical or spherical surface produces a force on the resiliently supported core structure to change the flux linkages between coils 160—162. It is understood that coils 160—162 will be connected in a circuit such as shown in Fig. 2. A further modification is shown in Fig. 11 in which a flat disk 180 is supported near the upper boundaries of ports 181, 182 and is adapted to sense flow forces due to upwardly directed flow. A pair of metallic masses 184 and 185 are supported from rod 186 and extend into cups 187 and 188 which are filled with a bouyant liquid. The floats 184, 185 serve to stabilize the core structure and to work with the resilient supporting spring 187.

The flow sensing elements such as shown in Figs. 9–11 have been found preferable to the float system shown in Fig. 6 under certain conditions. For example, in measurement where extremely high flow rates are encountered, forces developed on a float system such as shown in Fig. 6 may be beyond the operating range of the suspension in which case any one of a combination of steps may be taken to effect an accurate flow measurement. A first step would be to modify or eliminate the flow diverter to reduce the magnitude of flow inside the instrument. Another step would be to modify the float such as shown in Figs. 9–11. It is to be understood that in any case the flow inside the instrument will depend upon the pressure difference between the inlet and outlet ports. By spacing the ports considerable distance it may be possible to obtain flow measurements in a given environment without any flow diversion, whereas a close port spacing would require flow diversion.

In one embodiment of this invention the flow sensing elements had the following specifications. The outer diameter of the housing (76, 102, etc.) was 1½", thereby permitting operation in producing tubing. The cable 12, Fig. 2 had a diameter of 3/16" permitting it to be used through well heads under high pressure. Springs 99 and 108 were of linear isolastic materials sold under the trade name of "Iso Elastic" by the John Chatillon & Sons, 85—93 Cliff Street, New York 38, New York. In order to accommodate different ranges of flow rates, springs were used having a helix diameter of ¼" to 5/16", an unstressed length in the order of 1½". Compliance or spring rate for several such springs is set out in the following table:

Table I

| Spring rates: | Flow bbls. per day |
|---|---|
| .05 oz. per inch | 26.67 |
| .15 oz. per inch | 80 |
| .60 oz. per inch | 320 |
| 1.2 oz. per inch | 640 |

The springs as above specified permitted elongations of a factor of four (4) with a linear stress-strain relation. The values of flow rates included in Table I were obtained where the entire flow was diverted through the cylinder 102. Similar quantitative measurements can be made with partial flowed diversion upon suitable calibration of the instrument in a flow path of given diameter.

These and other modifications will now suggest themselves to those skilled in the art, and it is intended to cover such modifications as fall within the scope of the appended claims.

What is claimed is:

1. A well logging instrument comprising a long thin housing having a flow channel through at least a portion of the length thereof, a single conductor shielded cable extending from the surface of the earth downwards to said housing and forming a current path, a source of alternating current at the earth's surface connected to said cable, a transformer in said housing having a plurality of coils one of which is connected to said cable for flow therethrough of alternating current from said source, means including a rectifying circuit connected between another of said coils and said cable for applying to said cable a unidirectional voltage proportional to the alternating current voltage induced in said other coil, a spring mounted in said housing and spaced from said channel, a magnetic core for said transformer supported at one end by said spring for movement relative to said coils, a float member positioned in said channel and connected at one end to the other end of said core, said float member being responsive to flow-dependent forces in said channel for moving said core relative to said coils in proportion to said forces, and means including a circuit connected to said cable at the earth's surface for measuring variations in said unidirectional voltage in determination of fluid flow at said depth.

2. The combination set forth in claim 1 in which said transformer includes three coils mounted in an end-to-end relation coaxially of said core, the center coil being connected directly to said cable and the outer coils being connected in series opposition and through said rectifying circuit to said cable.

3. The combination set forth in claim 1 in which said transformer includes two coils mounted in an end-to-end relation and encircling said core with one of said coils connected directly to said cable and the other of said coils connected through said rectifying circuit to said cable.

4. The combination set forth in claim 1 in which said rectifying means includes a voltage doubler, and inductive impedance means connected between said cable and said voltage doubler.

5. A well logging system comprising an elongated housing, a single conductor cable having a metallic shield extending from the surface of the earth downward to said housing, a source of alternating current connected between said conductor and said shield for conducting alternating current, a first condenser connected in series with said single conductor at the earth's surface, a second condenser connected in series with said single conductor in said housing, a first transformer coil supported coaxially in said housing and connected to one terminal of said second condenser and to said shield for flow therethrough of alternating current, a second coil mounted adjacent said first coil in an end to end relation, a full wave voltage doubling rectifier, a transformer connected between said second coil and the input of said rectifier, a pair of inductances for connecting between the output terminals of said rectifier and the terminals of said second condenser, means connected to the terminals of said first condenser for measuring the magnitude of the voltage induced in said second coil, and a core structure resiliently supported adjacent said coils and positionally responsive to forces developed by flow of fluid in said housing for varying the magnitude of the voltage induced in said second coil.

6. In a well logging system using a single conductor shielded cable for sensing at the earth's surface variations in the magnitude of a condition in a well bore, a telemetering system which comprises a source of alternating current connected to said cable at the earth's surface for energizing said system, a housing supported by said cable for movement through said well bore, means in said housing responsive to said alternating current for producing an alternating current signal proportional in magnitude to said condition, a condenser in said housing connected in series with said single conductor cable, a series circuit comprising an inductance connected at one terminal to a first terminal of said condenser, a pair of condensers connected in series and a second inductance connected at one terminal to the second terminal of said condenser, a pair of rectifiers of like polarities forming a series circuit connected in parallel to said pair of condensers, means for applying said alternating current signal between a first terminal formed by the juncture intermediate said pair of condensers and a second terminal formed by a juncture intermediate said rectifiers to produce a unidirectional voltage proportional to said alternating current signal which voltage is then applied across said first named condenser by way of said inductances, a condenser connected in series with said conductor at the earth's surface, and means for measuring said unidirectional voltage as it is developed across said last named condenser.

7. A well logging system comprising an elongated housing, a single conductor cable having a metallic shield extending from the surface of the earth downward to said housing, a source of alternating current connected between said conductor and said shield for conducting alternating current, a first condenser connected in series with said single conductor at the earth's surface, a second condenser connected in series with said single conductor in said housing, a first transformer coil supported coaxially in said housing and connected to one terminal of said second condenser and to said shield for flow therethrough of alternating current, a second coil mounted adjacent said first coil in an end-to-end relation, a rectifier, a transformer connected between said second coil and the input of said rectifier, a pair of elements having high impedance to alternating current connected between the output terminals of said rectifier and the terminals of said second condenser, means connected to the terminals of said first condenser for measuring the magnitude of the voltage induced in said second coil, and a core structure resiliently supported adjacent said coils and positionally responsive to forces developed by flow of fluid in said housing for varying the magnitude of the voltage induced in said second coil.

References Cited in the file of this patent

UNITED STATES PATENTS

| | | |
|---|---|---|
| 1,631,746 | Luckey | June 7, 1927 |
| 1,652,472 | Erwin et al. | Dec. 13, 1927 |
| 2,039,405 | Green et al. | May 5, 1936 |
| 2,338,872 | Robidoux | Jan. 11, 1944 |
| 2,362,661 | Peters | Nov. 14, 1944 |
| 2,368,532 | Fearon | Jan. 30, 1945 |
| 2,408,524 | Mestas | Oct. 1, 1946 |
| 2,414,318 | Middel | Jan. 14, 1947 |
| 2,451,762 | Millikan | Oct. 19, 1948 |
| 2,472,056 | Otis | May 31, 1949 |
| 2,649,710 | Dale | Aug. 25, 1953 |
| 2,709,365 | Piety | May 31, 1955 |
| 2,723,721 | Corsette | Nov. 15, 1955 |
| 2,729,101 | Wiley | Jan. 3, 1956 |
| 2,733,605 | Buck | Feb. 7, 1956 |

FOREIGN PATENTS

| | | |
|---|---|---|
| 130,058 | Great Britain | July 31, 1919 |
| 199,492 | Great Britain | June 28, 1923 |
| 655,367 | Great Britain | July 18, 1951 |